US012567968B2

(12) United States Patent
Laing et al.

(10) Patent No.: US 12,567,968 B2
(45) Date of Patent: Mar. 3, 2026

(54) VALUES EXCLUSIONS

(71) Applicant: Hewlett-Packard Development Company, L.P., Spring, TX (US)

(72) Inventors: Thalia May Laing, Bristol (GB); Maugan Villatel, Bristol (GB); Adrian John Baldwin, Bristol (GB); Pierre Louis Robert Belgarric, Bristol (GB); Adrian Laurence Shaw, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 210 days.

(21) Appl. No.: 18/454,495

(22) Filed: Aug. 23, 2023

(65) Prior Publication Data

US 2024/0097905 A1      Mar. 21, 2024

(30) Foreign Application Priority Data

Sep. 16, 2022     (GB) ..................................... 2213628

(51) Int. Cl.
*H04L 9/32* (2006.01)
*H04L 9/08* (2006.01)
*H04L 9/40* (2022.01)

(52) U.S. Cl.
CPC .......... *H04L 9/3228* (2013.01); *H04L 9/0869* (2013.01); *H04L 9/3247* (2013.01); *H04L 63/067* (2013.01)

(58) Field of Classification Search
CPC ... H04L 9/3228; H04L 9/3247; H04L 9/0869; H04L 63/067
See application file for complete search history.

(56) References Cited

U.S. PATENT DOCUMENTS

| | | | |
|---|---|---|---|
| 7,873,170 | B2 | 1/2011 | Chang et al. |
| 8,082,450 | B2 | 12/2011 | Frey et al. |
| 9,489,528 | B2 | 11/2016 | Goel et al. |
| 10,171,239 | B2 | 1/2019 | Goel et al. |
| 2007/0061865 | A1 | 3/2007 | Bermudez et al. |
| 2008/0219453 | A1 | 9/2008 | Chang et al. |
| 2008/0320315 | A1 | 12/2008 | Frey et al. |

(Continued)

FOREIGN PATENT DOCUMENTS

| | | |
|---|---|---|
| AU | 7797198 A | 9/1999 |
| EP | 1109351 A2 | 6/2001 |

(Continued)

OTHER PUBLICATIONS

Cooper, D.A., et al., "Recommendation for Stateful Hash-Based Signature Schemes", NIST Special Publication 800-208, Oct. 2020, pp. 59.

(Continued)

*Primary Examiner* — David J Pearson
(74) *Attorney, Agent, or Firm* — Quarles & Brady LLP

(57) ABSTRACT

In an example, a computing device is described. The computing device comprises a processor. The processor is to generate a key using a value as an input to generate the key. The processor is further to, in response to generating the key, exclude the value from future use as the input. The processor is further to store an indication of a subsequent value to use as the input to generate a subsequent key. The indication is cryptographically associated with an entity to control third-party access to the indication.

20 Claims, 6 Drawing Sheets

(56)     References Cited

U.S. PATENT DOCUMENTS

| 2017/0054558 | A1 |  | 2/2017 | Goel et al. |  |
|---|---|---|---|---|---|
| 2019/0305951 | A1 | * | 10/2019 | Grubin | H04L 9/30 |
| 2020/0059373 | A1 | * | 2/2020 | Norum | H04L 9/0897 |
| 2020/0351074 | A1 | * | 11/2020 | Wood | H04L 9/0861 |
| 2021/0306155 | A1 | * | 9/2021 | Sastry | H04L 9/3236 |
| 2021/0374256 | A1 | * | 12/2021 | Elbaum | H04L 9/3026 |
| 2022/0086009 | A1 | * | 3/2022 | Vacek | H04L 9/0877 |
| 2022/0116385 | A1 |  | 4/2022 | Hertrich et al. |  |
| 2023/0179407 | A1 | * | 6/2023 | Jakobsen | H04L 9/085 |
|  |  |  |  |  | 713/171 |
| 2023/0308271 | A1 | * | 9/2023 | Seaborn | H04L 9/0869 |

FOREIGN PATENT DOCUMENTS

| EP | 1964307 | A1 | 9/2008 |
|---|---|---|---|
| WO | 99/46691 | A1 | 9/1999 |
| WO | 2007/080289 | A1 | 7/2007 |

OTHER PUBLICATIONS

Huelsing, A., et al., RFC 8391: XMSS: extended Merkle Signature Scheme, Internet Research Task Force (ITRF), May 2018, pp. 74.
McGrew, D., et al., "RFC 8554: Leighton-Micali Hash-Based Signatures", Internet Research Task Force (IRTF), Apr. 2019, pp. 61.

* cited by examiner

508

522  COMPUTING DEVICE

NON-TRANSITORY
MACHINE-READABLE
MEDIUM

524  DATA VERFICATION
INSTRUCTIONS

526  SIGNER
AUTHORIZATION
INSTRUCTIONS

500

FIRST
SIGNER

506  DATA

520

PROCESSOR

530

SECOND
SIGNER

532  VALUE

VALUES EXCLUSIONS

BACKGROUND

A cryptoprocessor may use a private key to sign data. A verifier may use a public key associated with the private key to verify that the data was signed by the cryptoprocessor.

BRIEF DESCRIPTION OF DRAWINGS

Non-limiting examples will now be described with reference to the accompanying drawings, in which.

DETAILED DESCRIPTION

Disclosed herein are computing devices, machine readable media and methods to exclude a value from use in a signature scheme.

As used herein, a stateful signature scheme refers to use of a function (e.g., a hash function in a stateful hash-based signature scheme) to construct a one-time signature (OTS) private key for use by a signer to produce a signature under the scheme. Such a signature scheme is considered stateful by virtue of the OTS private key generated under the scheme being single-use and ensuring that the OTS private key is not ever reused to sign data. Reusing an OTS private key of a stateful signature scheme may destroy the security of the scheme.

It may be necessary to prepare for the possibility that a signer such as a cryptoprocessor holding a private seed value may fail during the lifetime of the signer by introducing resiliency to the signing ecosystem. This may be relevant if the private seed value is to be used to generate OTS private keys over a long time period and/or replacing the associated public key would be difficult.

A copy of the private seed value and a latest value (e.g., state) used as an input to generate an OTS private key could be stored in a secure alternate location. However, simply copying the private seed value and the state may create a risk of state reuse, thereby destroying the security. In an example scenario where a signer has a private seed value and a state, these may have been backed up on an alternative device. The signer may increment the state, sign a message and then fail, losing both the private seed value and latest state (e.g., the latest counter value). The signer may then recover the key from the backup, which holds the previous, non-updated state, thus resulting in state reuse next time the signer signs, resulting in loss of all security.

Examples described herein provide an approach to provide resiliency in a signature scheme such as a stateful signature scheme whilst removing the chance of reusing a value used to generate a key under the scheme. There may be other (e.g., stateless) signature schemes which rely on a value as an input to generate a key. In an example, there may be scenarios where these schemes may need to keep a record of the latest value used as the input. However, if the signer fails, such a record may be lost. In an example, a signer may store information indicative of which value is to be used next time by the signer (or a backup signer) to derive a signature such that value reuse is prevented. The information may be stored in such a way that an entity can enforce whether the value may be used by a backup signer to derive a signature under the signature scheme. Thus, the entity may ensure that a value that has already been used to derive a signature is excluded from being reused by a backup signer, which may avoid loss of security in some scenarios such as where the signature scheme is a stateful signature scheme.

Figure 1:
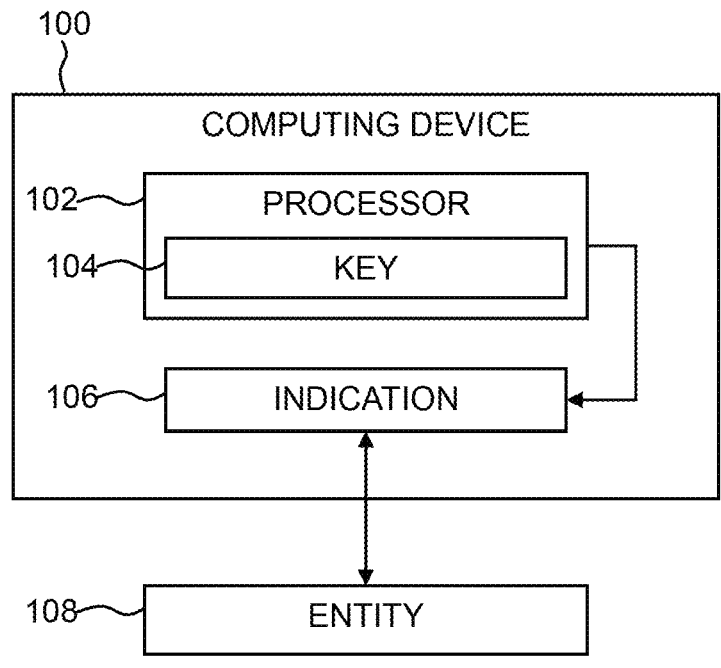
FIG. 1 is a schematic drawing of an example computing device to exclude a value from use in a signature scheme.

FIG. 1 is a schematic drawing of an example computing device 100 to exclude a value from use in a signature scheme. The computing device 100 may implement the functionality of a signer. Thus, the computing device 100 may be an entity that is trusted to sign data (e.g., a message).

An example implementation may be that a signer such as the computing device 100 is to provide a signing function as part of a computing infrastructure to provide updates. Such computing infrastructure may be set up to transmit a message comprising a software or firmware update to a recipient such as a user device (e.g., a laptop, phone, tablet, Internet-of-Things (IoT) device, printer or other hardware). In this example implementation, the signer may be a hardware security module (HSM) of the computing infrastructure and the HSM is to sign the message comprising the update using an OTS private key under the stateful signature scheme. Thus, the recipient may receive an authentication path from the signer, as part of the signature, to facilitate verification of the message.

Upon the signing procedure being completed the (signed) message may be sent to the recipient, which may allow the recipient to verify the message is authentic (e.g., it originated from a trusted source) so that the recipient may proceed to implement the software or firmware update according to the code.

In some examples, the computing device 100 may sign messages under a stateful signature scheme such as the hash-based stateful signature scheme described above. In some examples, the computing device 100 may sign messages under a different type of stateful signature scheme or a stateless signature scheme.

The computing device 100 comprises a processor 102. In some examples, the processor 102 may have access to instructions (e.g., stored in the computing device 100) readable and executable by the processor 102 to implement the functionality described herein.

The processor 102 is to generate a key 104 (e.g., a signing key) using a value (such as a state of a stateful signature scheme) as an input to generate the key 104.

Some examples of how the computing device 100 may generate such a key are now described.

In some examples, the key (i.e., the signing key) is generated by inputting a seed (e.g., a private seed value from the seed key pair of a stateful signature scheme) and an available state (such as an unused value within the state space of the stateful signature scheme) to a key generator (also referred to herein as a key generation function). The key generator is implemented by the computing device 100. In some examples, the resulting key may be referred to as a one-time use private key (e.g., an OTS private key of the Leighton-Micali Hash-based Signature Scheme (LMS), where the state used to generate the OTS private key is known as the leaf number in LMS). Ensuring that an OTS private key is used once (since the state is unique and not reused to generate a key) may maintain statefulness of a stateful signature scheme.

Example stateful hash-based signature schemes such as the Leighton-Micali Hash-based Signature Scheme (LMS) and the eXtended Merkle Signature Scheme (XMSS) specify that the signer is to maintain a state, which updates every time a signature is produced. The state is chosen from a finite set. For example, the state may be a counter which runs from 0 to $2^{20}-1$ for a Merkle tree of height 20 (where the tree height defines the number of states that are initially available under the stateful signature scheme prior to signing any messages). This state is used in conjunction with a private seed value to produce a one-time signing (OTS) private key, which is used to produce a signature. If the state, and therefore the OTS private key, is repeated and used to sign two distinct messages, the security of the scheme collapses. Thus, state management is a relevant consideration for maintaining the security of the scheme. In the examples of LMS and XMSS, the state is a counter (normally used in order e.g., starting at 0, 1, 2 and so on). As the number of states is finite, there is an upper bound on the number of signatures that can be produced for a given seed key pair (comprising a private seed value/key and an associated public key) and this upper bound is to not be exceeded.

In LMS, the seed used to derive the OTS private key is known as the signing key. Thus, any reference herein to a seed or private seed value may refer to a signing key in the context of LMS. However, as used herein, any reference to a key or signing key (in the context of producing a signature) may refer to an OTS private key such as used in LMS.

In some examples, the key generator is to generate the one-time use private key using a pseudorandom function (PRF). In some examples, an OTS private key may be generated from a seed (e.g., one_time_private_key=f(seed, i), where "i" is the state), where the function "f" may implement a PRF and/or a key derivation function (KDF) such as a hash-based message authentication code (HMAC)-based KDF (HKDF). However, any appropriate pseudorandom method may be implemented to generate the OTS private key from the seed and the state. A PRF may be used to derive a key under any appropriate signature scheme.

The processor 102 is to, in response to generating the key 104, exclude the value from future use as the input.

As indicated previously, if the value is a state of a stateful signature scheme, reuse of the state may destroy the security of the scheme. Thus, excluding the value (e.g., state) from future use in accordance with certain examples described herein may ensure that the value is not reused to produce a signature based on a key generated from the value. Excluding the value from future use as the input to a key generator may also be useful in other signature schemes.

The processor 102 is to store an indication 106 of a subsequent value to use as the input to generate a subsequent key 104. The indication 106 is cryptographically associated with an entity 108 to control third-party access to the indication 106.

Storage of the indication 106 may allow recovery of the value by the computing device 100 itself or by another signer in the event of failure of the computing device 100. In some examples, the indication 106 may be accessible to the entity 108 even in the event of failure of the computing device 100. For example, the indication 106 may be stored in a dedicated memory (not shown) that can be extracted from the computing device 100 or otherwise interfaced with by the entity 108 or another authorized device.

In some examples, the indication 106 may comprise the actual value that is to be used next (e.g., a free value to use as the input), or the previously used value (e.g., so that the processor 102 knows not to use such a value). Either way, the indication 106 may provide a way for the key generator to decide which value should be used next (or, in other words, exclude a previously used value from being reused).

As noted above, there is a cryptographic association between the indication 106 and the entity 108. The cryptographic association may provide a way for the entity 108 to control access to the indication 106. As discussed below, the entity 108 may take the role of an enforcer to ensure that a second signer, when authorized to do so, can access the value e.g., in the event of failure of a first signer corresponding to the computing device 100. Thus, the entity 108 may allow message signing to continue (by another signer) with the value (of a set of values such as a counter associated with a signature scheme) as an input to the key generator e.g., with the same private seed value used as an additional input to generate the key 104. The cryptographic association may be achieved in various ways, as described in more detail in the examples provided below.

As noted above, the indication 106 may be stored in a dedicated memory. Such a memory may be resilient to failure of the computing device 100 hosting the memory. In some examples, the memory may be a digital memory (e.g., based on storing bits as 1s and 0s). In some examples, the memory may be an analog memory (e.g., where the value is indicated by a parameter such as voltage or charge being above or below a threshold).

In the example that the computing device 100 is a cryptoprocessor such as an HSM, the memory may be a type of memory that is not wiped if the cryptoprocessor fails. Such a memory may be used to securely maintain the value even if a private seed value (used as another input to the key generator) is lost. This approach may enable a separate backup of the private seed value, which may be more secure than storing both the value and the private seed value in the same location. Upon designating a new signer, such a backup of the private seed value may be recovered along with the latest value to be used as the input to the key generator. Appropriate measures may be taken by an enforcer to ensure that the designation operation is performed once, thereby avoiding risk of value reuse.

The enforcer functionality described herein may be useful in schemes other than those where the entire private key is to be kept confidential. In certain signatures schemes such as stateful hash-based signature schemes like LMS or XMSS, the private key may be split into two parts. In a first part, the private seed value is to remain confidential. In a second part, the value (e.g., the counter/state) does not need to be confidential.

The computing device 100 may provide functionality to ensure that the latest version of the value (e.g., the state in the case of a stateful signature scheme) is retrievable in the event of failure of the computing device 100. Appropriate measures may be put in place so that the latest value used to generate a key to produce a signature under a signature scheme can be accessed by a backup computing device. Such measures may ensure that the value is not reused by the backup computing device to derive a signature to maintain security whilst providing resiliency (e.g., so that a public key deployed under the signature scheme may remain valid for verifying future messages signed under the signature scheme).

Thus, the computing device 100 (and the related examples described herein) may facilitate resiliency of a private seed value associated with a stateful signature scheme implemented by a signer whilst removing the chance of state reuse by a backup signer. Enabling a backup signer to use the same private seed value may provide resiliency, while enforcing (by the entity 108) that the value is not reused as an input to a key generator of the backup signer may avoid the risk of state reuse by the backup.

The ability to manage values under a signature scheme (e.g., states under a stateful signature scheme) such that a backup signer may be trusted to sign under the same scheme without risking value reuse in accordance with certain examples described herein may avoid the need to implement a more complex backup system, which may involve producing large signatures as a result of there being multiple backup signers. Using this approach may allow smaller signatures to be produced for a given size of the value (e.g., state) space underpinning the (e.g., stateful) signature scheme. In some examples where a recipient of a signed message is resource constrained, such as may be the case in a secure boot procedure implemented by a user device, the user device may need less time to perform signature verification as a result of the small signature size.

In some examples, to facilitate verification of a signed message, the computing device 100 may send the (one-time) signature and information (i.e., an authentication path) needed for verifying the signature to allow a verifier to verify that a candidate public key derived from the signature is contained in a Merkle tree associated with the signature scheme. The authentication path for a given state indicates the nodes and/or public keys contained in the Merkle tree for the stateful signature scheme to allow a root public key for the stateful signature scheme to be computed.

In some examples, to verify the signer message, the verifier may receive the signed message and compute a candidate OTS public key. The verifier can then verify that the candidate OTS public key is contained in the Merkle tree with the public key as its root node. In this regard, the verifier may compute a candidate OTS public key from the signature and the message. Using the state value and the authentication path, the verifier may verify that the candidate OTS public key is contained in the Merkle tree with the public key as its root node. If the verification procedure is successful, the verifier accepts the signature as valid and the message as authentic.

In some examples, a signer such as the computing device 100 may comprise a cryptoprocessor to perform a cryptographic operation such as signing data with a private key, encrypting data, etc. A cryptoprocessor may implement a level of security that specifies whether the cryptoprocessor is to do anything with data stored therein (e.g., keying material) in response to an event such as a physical attack on the cryptoprocessor. The level of security specified for the cryptoprocessor may depend on the use case of the cryptoprocessor.

Examples of cryptoprocessors (sometimes referred to as secure cryptoprocessors) that may implement a physical security mechanism include devices such as a cryptographic module or hardware security module (HSM). In some examples, the level of security provided by a cryptoprocessor may comply with a standard such as specified by the Federal Information Processing Standards (FIPS) Publications 140-2 or 140-3.

Figure 2:
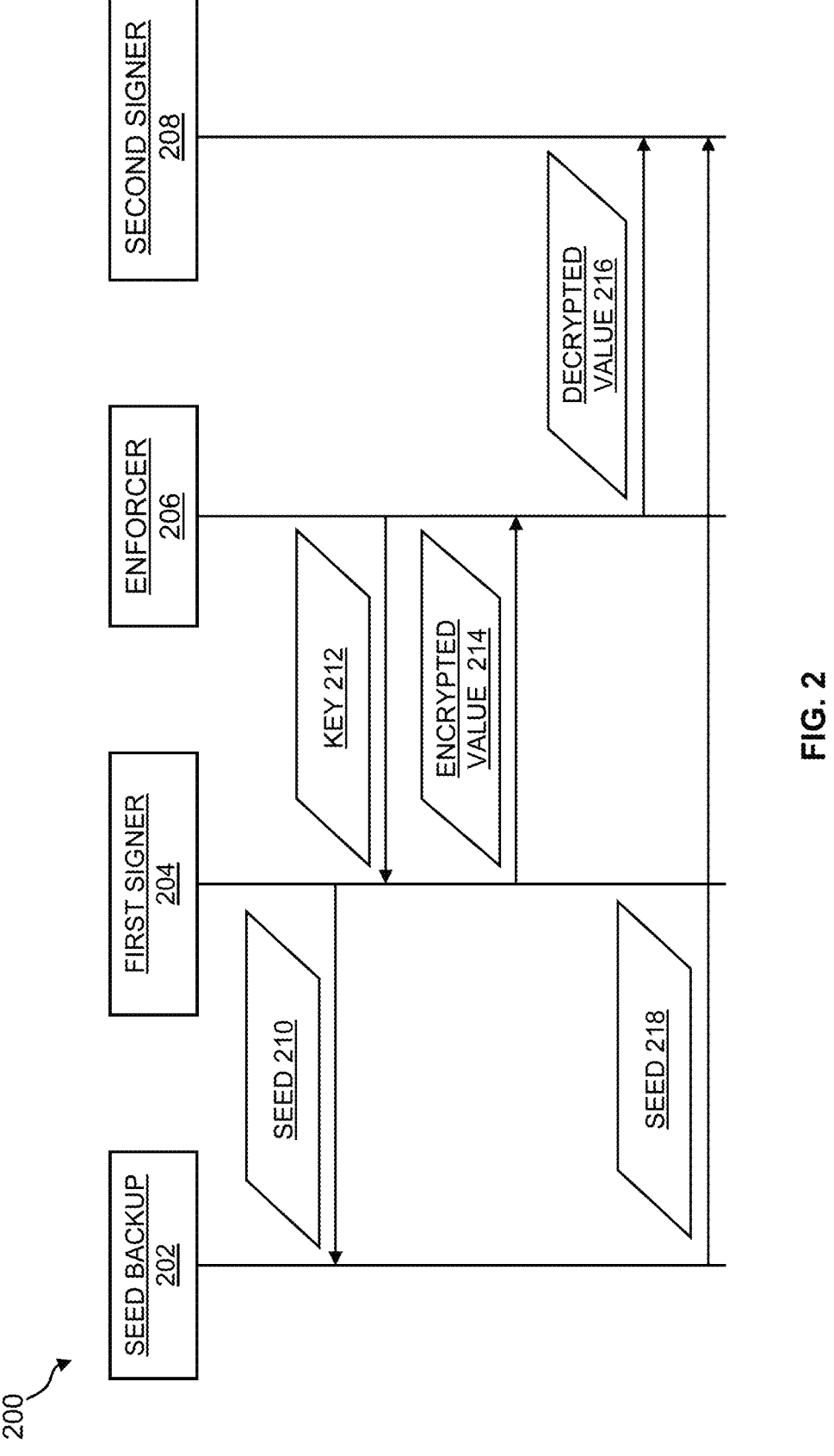
FIG. 2 is a flowchart of an example method of excluding a value from use in a signature scheme.

FIG. 2 is a flowchart of an example method 200 of excluding a value from use in a signature scheme. In some examples, a part of the method 200 may be implemented by the computing device 100 or other computing devices or machine-readable media described herein. The flowchart depicts interactions between a seed backup 202, first signer 204, enforcer 206 and second signer 208. The first signer 204 and/or the second signer 208 may implement the functionality of the computing device 100 of FIG. 1 and related examples. The enforcer 206 may implement the functionality of the entity 108 of FIG. 1 and related examples.

In the method 200, the first signer 204 may store a seed 210 (e.g., a private seed value usable as an input to a key generator such as an OTS private key). As depicted by FIG. 2, the seed 210 is provided to the seed backup 202. In some examples, the seed backup 202 may be another computing device trusted to store the seed 210. In some examples, the seed 210 may be physically printed out e.g., in the form of a quick response (QR) code and kept in a secure location. In the case where the seed backup 202 is another computing device, the backup of the seed 210 may not be used for signing. That is, the seed backup 202 may not be a signer. Thus, the seed backup 202 may be accessed if the first signer 204 fails. In this case, the seed 210 may be retrieved by the second signer 208 in the circumstances described below. A computing device implementing the seed backup 202 may not store the value (e.g., state), since the indication 106 stored by e.g., the first signer 204 may instead provide the backup of the value.

In some examples, the first signer 204 comprises, or has access to, a secure (authenticated, not necessarily confidential), memory dedicated to storing the value (e.g., the indication 106). This memory may be non-volatile, or may have its own power such that if the first signer 204 fails (and deletes or loses its keys), the value may remain intact. In some examples, the memory may be detachable (e.g., it can be extracted) from the first signer 204 without being wiped by the process of detaching the memory. In some examples, the memory may have an interface to enable the enforcer 206 to access the value (e.g., with or without detaching the memory). In some examples, the memory may be used to store the value but not the private seed value.

Each time the first signer 204 wants to sign a message, the first signer 204 may retrieve the value from the memory, increment the value (since the retrieved value is then considered used), and then use the retrieved value to generate the signing key. In some examples, if the increment operation is computationally expensive, the first signer 204 could also perform it in bulk. For example, the first signer 204 may retrieve the value from its memory, increment it by N, and then produce up to N signatures.

As stated above, the memory storing the value may be authenticated. In some examples, such authentication may be achieved using a symmetric scheme (e.g., with a hash-based message authentication code (HMAC) included in the relevant part of the data stored in the memory) with a key shared with the entity that is to verify the integrity of the value stored in the memory. In some examples, the authentication may be provided by producing a stateful hash-based signature based on the value so that the entity can authenticate the value by checking that a candidate public key derived from the signature is contained in the Merkle tree associated with the stateful hash-based signature scheme.

Since value reuse could destroy security in some scenarios (such as in a stateful signature scheme), the value may be stored in such a way to prevent rollback attacks. In some examples, the value may be stored in such a way that previously used values are securely erased from the memory. That is, upon a signature being produced based on a value, this value is to replace a previous value used to produce a previous signature.

The memory may comprise an appropriate type of memory to facilitate the authenticated and/or resilient storage of the value. Examples of such types of memory may include technology such as battery-backed dynamic random-access memory (DRAM), static random access memory (SRAM), flash storage or replay-protected memory block (RPMB).

In some examples, the value may not be readable by an attacker prior to the first signer 204 failing. For example, in the case where the first signer 204 is an HSM, the memory may be located within a protected part of the HSM so that trying to read or access this memory may trigger the deletion of the private key of that HSM.

In the method 200, an encryption key 212 is provided by the enforcer 206 to the first signer 204. The encryption key 212 is used to encrypt the value to produce an encrypted value 214, which is stored in the memory during use of the first signer 204.

In the event of failure of the first signer 204, the enforcer 206 may retrieve the encrypted value 214 from the first signer 204 (e.g., by accessing the memory). Since the enforcer 206 may have the relevant decryption key, the enforcer 206 may decrypt the value 214 to produce a decrypted value 216. An attacker without the relevant decryption key may be unable to interpret the encrypted value 214 even if the attacker manages to access the memory.

Encrypting the value 214 to the enforcer 206 is an example of a cryptographic association described previously where the indication 106 (which may include the encrypted value 214 which is indicative of the decrypted value 216) is cryptographically associated with the entity 108 (which may correspond to the enforcer 206).

The enforcer 206 may authorize the second signer 208 to continue producing signatures under the signature scheme associated with the seed 210. Thus, the enforcer 206 may send the decrypted value 216 to the second signer 208. The second signer 208 may retrieve the seed 218 (same as the seed 210) from the seed backup 202.

Upon receiving both quantities (i.e., the decrypted value 216 and the seed 218), the second signer 208 may be the authorized signer of the signature scheme.

In some examples, there is the possibility that more than one entity could be promoted to signer by virtue of each entity receiving the value, which could destroy the security of the signature scheme.

Thus, in some examples, repeated sharing of the value may be prevented by using another secure entity (e.g. another signer or a cluster of signers using a threshold scheme in which a specified proportion of the signers need to agree) that could ensure that the restoration of the value (after failure of the first signer 204) is performed once by the enforcer 206. An example of how the enforcer 206 may enforce one-time restoration of the value is described below.

In some examples, during operation prior to failing, the first signer 204 may encrypt the value in its memory using a key owned by the enforcer 206. In some examples, the key may be a shared key under a symmetric scheme. In some examples, the key may be a public key under an asymmetric scheme.

After the first signer 204 fails, when wanting to restore the value to a second signer 208, the second signer 208 and the enforcer 206 may establish a secure (authenticated) channel therebetween (e.g., using an additional key pair to encrypt or decrypt communications, as appropriate).

The enforcer 206 may decrypt the value with the key it owns, securely delete that key (or otherwise prevent the key from being used again), and may then send the decrypted value to the second signer 208. The enforcer 206 may enforce that the key is to be used once (and no more than once) to decrypt the value.

The second signer 208 may receive the value via the secure channel, and retrieve the backup of the seed 218. The second signer 208 may then be considered authorized to start signing based on a signing key generated from the decrypted value 216 and the seed 218.

Since the value 216 is decrypted once and is sent over an authenticated channel, the same value may not be restored more than once (which may prevent the value from being restored more than once which might otherwise increase the risk of reusing the value).

An alternative approach for establishing the cryptographic association is described in the example provided below.

Figure 3:
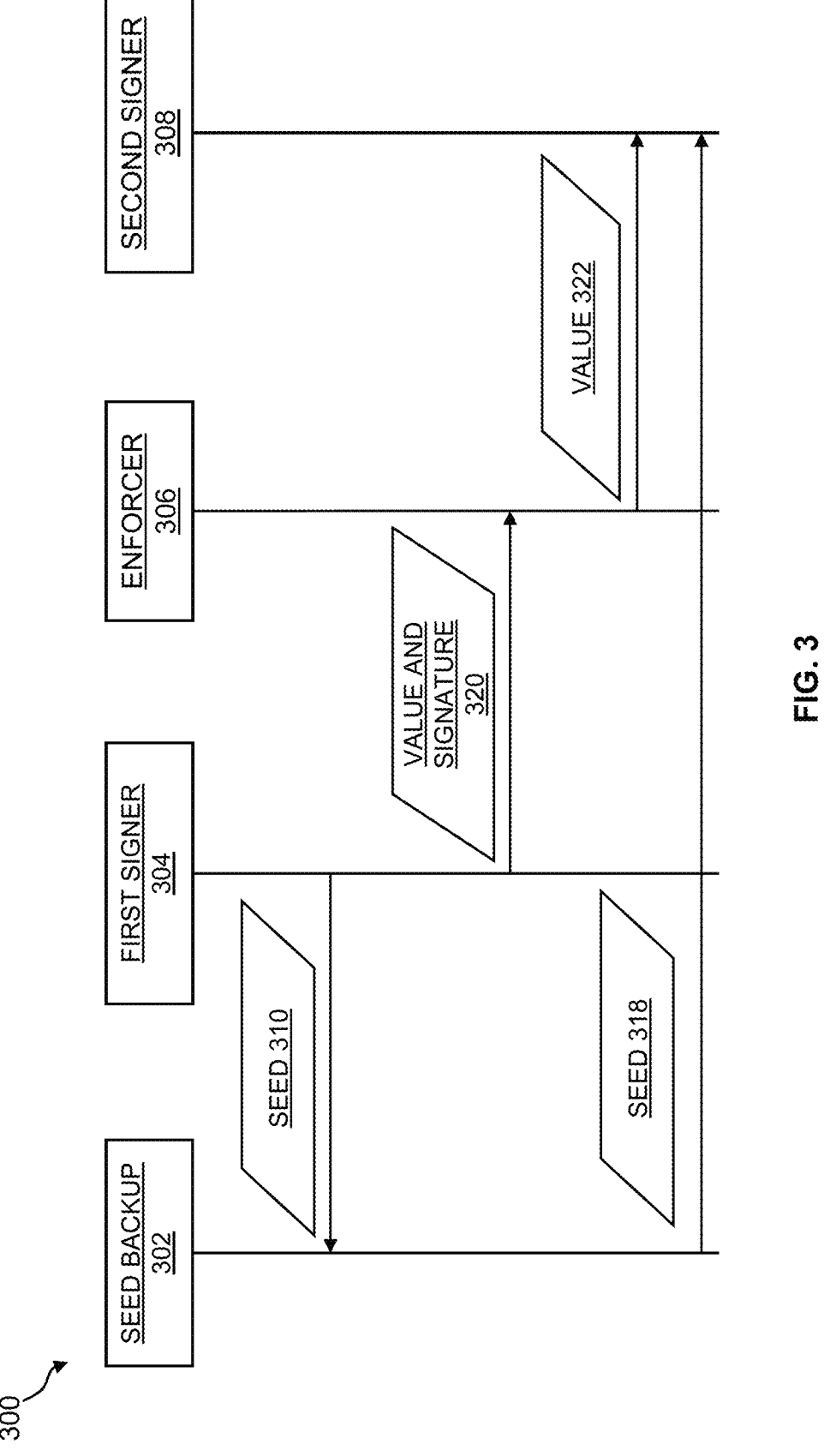
FIG. 3 is a flowchart of an example method of excluding a value from use in a signature scheme.

FIG. 3 is a flowchart of an example method 300 of excluding a value from use in a signature scheme. In some examples, a part of the method 300 may be implemented by the computing device 100 or other computing devices or machine-readable media described herein. The flowchart depicts interactions between a seed backup 302, first signer 304, enforcer 306 and second signer 308. The entities may have the same or similar functionality to the correspondingly named entities in FIG. 2. However, the implementation is different, as described below.

In the example method 300, the seed 310 is backed up by the seed backup 302 in the same manner as in the method 200 of FIG. 2.

However, the value is signed using a private key of the first signer 304. The signed value is stored in the memory in a similar manner to how the encrypted value is stored in the memory as described above. In the event of failure of the first signer 304, the enforcer 306 may be able to access the value and corresponding signature 320 stored in the memory of the first signer 304. The enforcer 306 may have access to the corresponding public key of the first signer 304 so that the enforcer 306 can verify that the value is indeed associated with the first signer 304. In this manner, there is a cryptographic association between the value and the enforcer 306 since the enforcer 306 is able to perform signature verification on the signature applied by the first signer 304. The enforcer 306 may have confidence that the value is authentic based on this cryptographic association. If the signature verification is successful, the enforcer 306 may provide the value 322 to the second signer 308. It may be assumed that the enforcer 306 does not release the value 322 to a non-authorized entity and/or that such a non-authorized entity may not be provided with access to the seed 318. Thus, the second signer 308 may assume the role of signer if it has access to both the seed 318 and the value 322.

Some further examples relating to the above are now described.

In some examples, the key is a one-time use key to generate a signature under a stateful signature scheme. The value is a state value under the stateful signature scheme. In some examples, the state value is selected from a state space comprising a set of available state values that are available (or free states) for generating one-time use keys.

In some examples, a seed (such as the seed 210, 218, 310, 318) is used as a further input to generate the key. For example, the seed and the value may be inputs to a key generator, as described above, to generate the key.

In some examples, the indication 106 is encrypted to the entity 108. This example may refer to the method 200 of FIG. 2.

In some examples, the indication 106 comprises a signature to allow the entity 108 to verify an integrity of the indication 106. This example may refer to the method 300 of FIG. 3.

Figure 4:
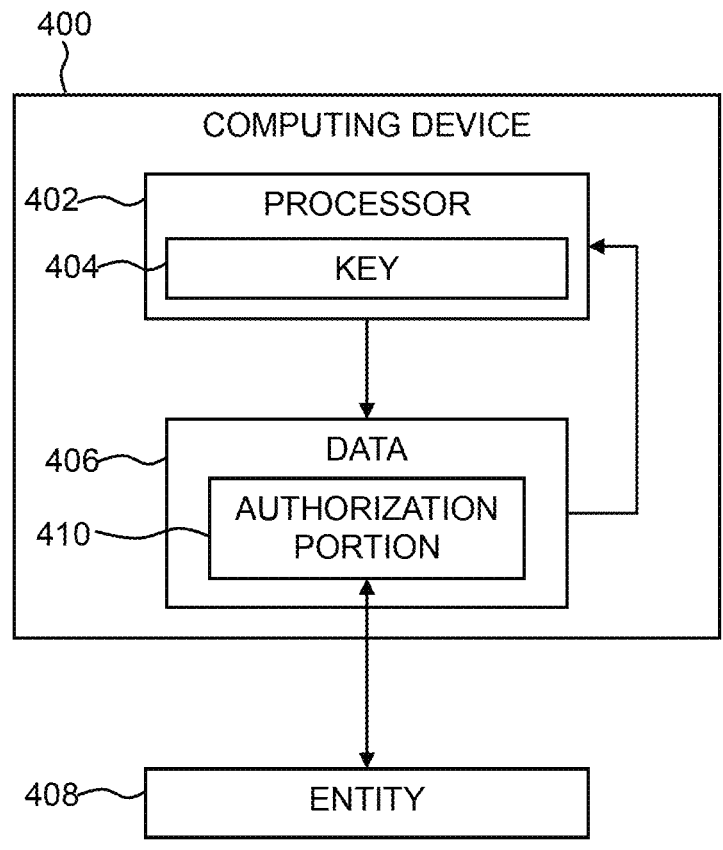
FIG. 4 is a schematic drawing of an example computing device to exclude a value from use in a signature scheme.

FIG. 4 is a schematic drawing of an example computing device 400 to exclude a value from use in a signature scheme. Reference numerals for features of the computing device 400 that are similar to or have corresponding functionality to features of the computing device 100 of FIG. 1 are incremented by 300. The computing device 400 may implement similar functionality to the computing device 100 (and provide similar technical results as described previously). Thus, further details of the features of the computing device 400 with similar functionality to the features of the computing device 100 can be understood with reference to the description of the computing device 100 and related examples.

The computing device 400 comprises a processor 402. An entity 408 (e.g., an enforcer) is also shown in FIG. 4.

The processor 402 is to generate a key 404. The key 404 is based on a value used as an input (e.g., to a key generator) to generate the key 404. The value is determined from data 406 (e.g., corresponding to the indication 106) stored in the computing device 400. The value is excluded from future use as the input as a result of the processor 402 generating the key 404. The data 406 comprises an authorization portion 410 to facilitate authorization of third-party access to the data 406 by the entity 408. The entity 408 has a cryptographic link to (e.g., a cryptographic association with) the authorization portion 410.

The processor 402 is to instruct update of the data 406 to indicate that an available value that has not been excluded from future use is to be used as the input next time a new key 404 is to be generated.

Similar to the computing device 100 of FIG. 1 and related examples, in the event of failure of the computing device 400, the value in the data 406 may be retrieved. The authorization portion 410 may be such that the entity 408 can control access to the value by a replacement (e.g., backup) signer such as the second signer 208, 308. For example, the value in the data 406 may be encrypted to the entity 408 such that the entity 408 can retrieve the value but no other entity can retrieve the value. In this example, the authorization portion 410 comprises the encrypted value. In another example, the authorization portion 410 may comprise a signature applied by the computing device 400 such that a holder of the associated public key (e.g., the entity 408) can authenticate the data 406 and authorize another signer to use the value in a subsequent signing operation.

Some examples relating to the computing device 400 are described below.

In some examples, the processor 402 is to implement a stateful signature scheme and the value is an available state value under the stateful signature scheme.

In some examples, the authorization portion 410 comprises a tag to cryptographically authenticate an integrity of the data 406. The tag is associated with both the computing device 400 and the entity 408. For example, the tag may comprise a message authentication code based on keys provided by the computing device 400 and entity 408.

In some examples, the processor 402 is to instruct deletion of the data 406 from which the value is determined in response to generating the key 404 based on the value. Such deletion may help to prevent roll-back attacks. Thus, the freshest value may be maintained whilst old values are deleted.

In some examples, the computing device 400 is a cryptoprocessor. The data 406 may remain undeleted in response to failure of the cryptoprocessor (e.g., due to an attack). Whereas signing material might be deleted by the cryptoprocessor, the data 406 may be retained (e.g., in a dedicated memory) so that the value can be extracted by the entity 408.

Figure 5:
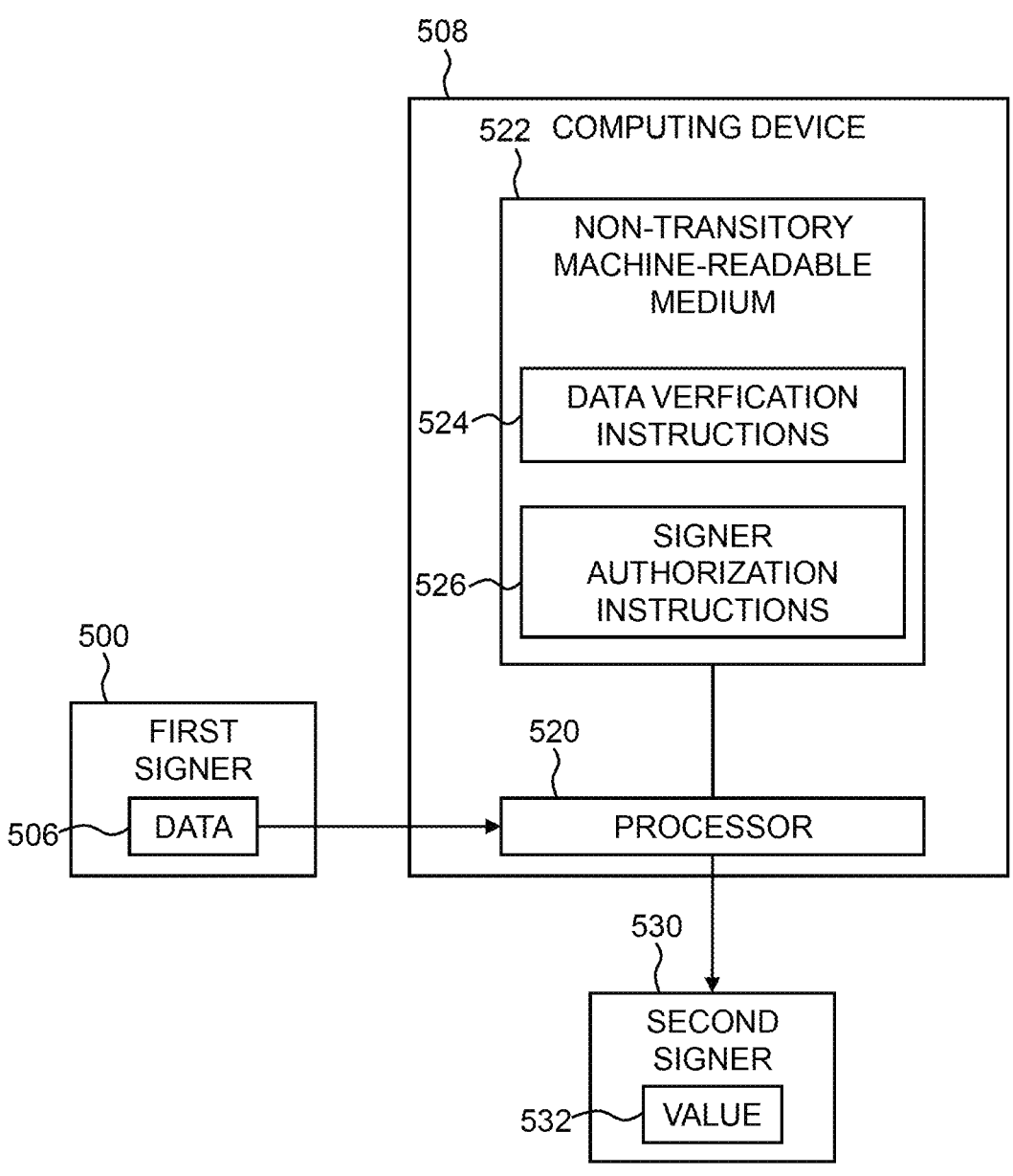
FIG. 5 is a schematic drawing of an example computing device to enforce exclusion of a value from use in a signature scheme.

FIG. 5 is a schematic drawing of an example computing device 508 to enforce exclusion of a value from use in a signature scheme. The computing device 508 may provide similar functionality to the entity 108 of FIG. 1 and related examples. Reference numerals for features of the computing device 508 that are similar to or have corresponding functionality to features of the trusted entity 108 of FIG. 1 are incremented by 400. The computing device 508 may implement functionality to enforce that a single signer (such as corresponding to the computing device 100 and related examples) is able to sign at any one time whilst ensuring resiliency of the signature scheme since the computing device 508 may allow a backup signer to take over signing in the event of failure of the original signer. Thus, further details of the features of the computing device 508 with similar functionality to the features of the trusted entity 108 can be understood with reference to the description of the trusted entity 108 and related examples.

The computing device 508 comprises a processor 520 and a non-transitory machine readable medium 522.

As used herein, the term "non-transitory" does not encompass transitory propagating signals.

The non-transitory machine-readable medium 522 stores instructions readable and executable by the processor 520. The instructions comprise data verification instructions 524 and signer authorization instructions 526.

The data verification instructions 524 are to verify data 506 stored in a first signer 500 based on a cryptographic association between the first signer 500 and the computing device 508. The data 506 is indicative of a value (e.g., a state value) to use as an input (e.g., to a key generator) to generate a one-time use key that is based on the value. The value has not been excluded from future use as the input by the first signer 500.

The signer authorization instructions 526 are to authorize a second signer 530 to store the value 532 in response to verifying the data 506. The second signer 530 may then take on the role of signer under the signature scheme and using the same seed as the first signer 500 and the value 532 as input to its key generator to generate a key to produce a signature on a message.

In some examples, the computing device 508 may provide the role of an enforcer to ensure that a replacement signer can be authorized under a signature scheme that uses the value as an input to generate a signing key under the scheme whilst ensuring that the value is not reused by any signer.

Figure 6:
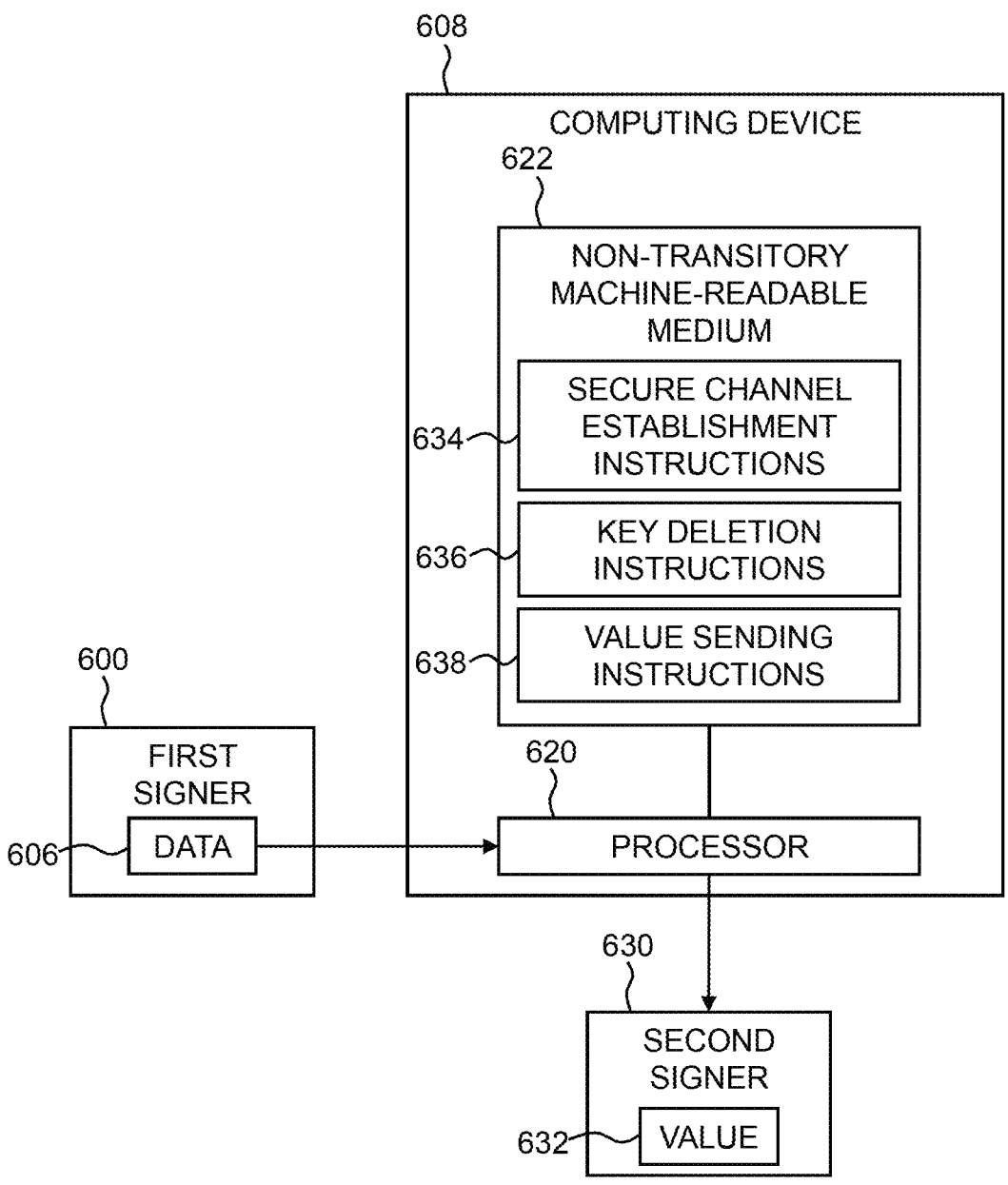
FIG. 6 is a schematic drawing of an example computing device to enforce exclusion of a value from use in a signature scheme.

FIG. 6 is a schematic drawing of an example computing device 608 to enforce exclusion of a value from use in a signature scheme. Reference numerals for features of the computing device 608 that are similar to or have corresponding functionality to features of the computing device 508 of FIG. 5 are incremented by 100. The computing device 608 may implement similar functionality to the computing device 508 (and provide similar technical results as described previously). Thus, further details of the features of the computing device 608 with similar functionality to the features of the computing device 508 can be understood with reference to the description of the computing device 508 and related examples.

The computing device 608 comprises a processor 620 and a non-transitory machine readable medium 622.

The non-transitory machine-readable medium 622 stores instructions readable and executable by the processor 620. The instructions comprise the instructions stored in the computing device 508 of FIG. 5. In some examples, the instructions may comprise further instructions as described below.

In some examples, the processor 620 is to verify the cryptographic association by successfully decrypting the data 606 where the data 606 is encrypted to the computing device 608 by the first signer 600.

In some examples, the processor 620 is to verify the cryptographic association by successfully authenticating a signature provided in the data 506 by the first signer 500. The processor 620 is further to enforce that the data 506 cannot be stored in another signer (e.g., the second signer 630) in response to determining that the value has (already) been stored by the second signer 630. In some examples, the public key of the first signer 500 may be given to the computing device 508 in a trusted manner during setup so that the computing device 508 can perform the signature verification on the data 506. In this manner, the value is prevented from being reused by more than one signer at a time.

In some examples, the data 606 is accessible to the computing device 608 in response to failure of the first signer 600. In this failure scenario, access to the data 606 may be facilitated by the computing device 608.

In some examples, the instructions comprise secure channel establishment instructions 634, key deletion instructions 636 and value sending instructions 638. The secure channel establishment instructions 634 are to establish a first secure channel between the computing device 608 and the first signer 600 using a first encryption key (e.g., associated with the first signer 600). The secure channel establishment instructions 634 are further to decrypt the data 606 with a first decryption key associated with the first encryption key. The first decryption key is stored in the computing device 608. The key deletion instructions 636 are to delete the first decryption key. The secure channel establishment instructions 634 are further to establish a second secure channel with the second signer 630 using a second encryption key (e.g., associated with the second signer 630). The value sending instructions 638 are to send the value 632 to the second signer 630 via the second secure channel in response to authorizing the second signer 600. Any of the keys described above could be generated under a symmetric or asymmetric scheme.

Any of the blocks, nodes, instructions or modules described in relation to the figures may be combined with, implement the functionality of or replace any of the blocks, nodes, instructions or modules described in relation to any other of the figures. For example, methods may be implemented as machine-readable media or computing devices, machine-readable media may be implemented as methods or computing devices, and computing devices may be implemented as machine-readable media or methods. Further, any of the functionality described in relation to any one of a method, machine readable medium or computing device described herein may be implemented in any other one of the method, machine readable medium or computing device described herein. Any claims written in single dependent form may be re-written, where appropriate, in multiple dependency form since the various examples described herein may be combined with each other.

Examples in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, flash storage, etc.) having computer readable program codes therein or thereon.

The present disclosure is described with reference to flow charts and block diagrams of the method, devices and systems according to examples of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing circuitry, or a module thereof, may execute the machine-readable instructions. Thus, functional nodes, modules or apparatus of the system and other devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A computing device comprising:
a processor to:
  generate a key using a value as an input to generate the key;
  in response to generating the key, exclude the value from future use as the input;
  store an indication of a subsequent value to use as the input to generate a subsequent key in a dedicated memory, wherein the indication is cryptographically associated with an entity to control third-party access to the indication; and
  upon failure of the computing device, allow the entity to access the indication via the dedicated memory such that the entity can verify the subsequent value and allow a second computing device to generate the subsequent key using the subsequent value.

2. The computing device of claim 1, wherein:
the key is a one-time use key to generate a signature under a stateful signature scheme; and
the value is a state value under the stateful signature scheme.

3. The computing device of claim 1, wherein the processor is to use a seed as a further input to generate the key.

4. The computing device of claim 1, wherein the processor is to encrypt the indication such that the indication is encrypted to the entity.

5. The computing device of claim 1, wherein the indication comprises a signature to allow the entity to verify an integrity of the indication.

6. The computing device of claim 5, wherein the signature allows the entity to verify the integrity of the indication by determining that a candidate public key derived from the signature is contained in a Merkle tree.

7. The computing device of claim 1, wherein the dedicated memory comprises a non-volatile memory of the computing device.

8. A computing device comprising:
a processor to:
  generate a key, wherein the key is based on a value used as an input to generate the key, wherein the value is determined from data stored in a dedicated memory of the computing device, wherein the value is excluded from future use as the input as a result of the processor generating the key, and wherein the data comprises an authorization portion to facilitate authorization of third-party access to the data by an entity with a cryptographic link to the authorization portion;
  instruct update of the data to indicate that an available value that has not been excluded from future use is to be used as the input next time a new key is to be generated; and
  upon failure of the computing device, allow the entity to access the data via the cryptographic link such that the entity can verify the available value and allow a second computing device to generate the new key using the available value as the input.

9. The computing device of claim 8, wherein the processor is to implement a stateful signature scheme and the value is an available state value under the stateful signature scheme.

10. The computing device of claim 8, wherein the authorization portion comprises a tag to cryptographically authenticate an integrity of the data, wherein the tag is associated with both the computing device and the entity.

11. The computing device of claim 8, wherein the processor is to instruct deletion of the data from which the value is determined in response to generating the key based on the value.

12. The computing device of claim 8, wherein:
the computing device is a cryptoprocessor; and
the data is to remain undeleted in response to failure of the cryptoprocessor.

13. The computing device of claim 8, wherein the dedicated memory comprises a non-volatile memory.

14. A non-transitory machine-readable medium storing instructions readable and executable by a processor of a computing device to:
  verify data stored in a dedicated memory of a first signer based on a cryptographic association between the first signer and the computing device upon failure of the first signer, wherein the data is indicative of a value to use as an input to generate a one-time use key that is based on the value, and wherein the value has not been excluded from future use as the input by the first signer; and
  authorize a second signer to store the value in response to verifying the data such that the second signer can use the value as the input to generate the one-time use key.

15. The non-transitory machine-readable medium of claim 14, wherein the instructions are readable and executable by the processor to:
  verify the cryptographic association by decrypting the data, wherein the data is encrypted to the computing device by the first signer.

16. The non-transitory machine-readable medium of claim 14, wherein the instructions are readable and executable by the processor to:
  verify the cryptographic association by authenticating a signature provided in the data by the first signer; and
  enforce that the data cannot be stored by a third signer in response to determining that the value has been stored by the second signer.

17. The non-transitory machine-readable medium of claim 14, wherein the data is accessible to the computing device in response to the failure of the first signer.

18. The non-transitory machine-readable medium of claim 14, wherein the instructions are readable and executable by the processor to:
  establish a first secure channel between the computing device and the first signer using a first encryption key;
  decrypt the data with a first decryption key associated with the first encryption key, wherein the first decryption key is stored in the computing device;
  delete the first decryption key;
  establish a second secure channel with the second signer using a second encryption key; and
  send the value to the second signer via the second secure channel in response to authorizing the second signer.

19. The non-transitory machine-readable medium of claim 14, wherein the dedicated memory comprises a non-volatile memory of the first signer.

20. The non-transitory machine-readable medium of claim 14, wherein the instructions are readable and executable by the processor to verify the data stored in the dedicated memory of the first signer by verifying that a candidate public key derived from the data is contained in a Merkle tree.

* * * * *